(12) United States Patent
Norton

(10) Patent No.: US 6,311,571 B1
(45) Date of Patent: Nov. 6, 2001

(54) SEAT BELT TENSION SENSOR

(76) Inventor: Peter Norton, P.O. Box 62, Northville, MI (US) 48167

( * ) Notice: Subject to any disclaimer, the term of this patent is extended or adjusted under 35 U.S.C. 154(b) by 0 days.

(21) Appl. No.: 09/625,765

(22) Filed: Jul. 26, 2000

Related U.S. Application Data

(63) Continuation-in-part of application No. 09/592,237, filed on Jun. 12, 2000, which is a continuation-in-part of application No. 09/565,703, filed on May 4, 2000, which is a continuation-in-part of application No. 09/547,482, filed on Apr. 12, 2000, which is a continuation-in-part of application No. 09/495,212, filed on Jan. 31, 2000.

(51) Int. Cl.[7] ....................................................... G01L 1/04
(52) U.S. Cl. ...................................................... 73/862.637
(58) Field of Search ........................... 73/826, 828, 862.391, 73/862.42, 862.392, 862.637

(56) References Cited

U.S. PATENT DOCUMENTS

| | | | |
|---|---|---|---|
| 4,572,543 | * 2/1986 | Tsuge et al. | 280/807 |
| 4,958,853 | * 9/1990 | Doty | 280/801.1 |
| 5,005,777 | * 4/1991 | Fernandez | 242/390.2 |
| 5,386,442 | * 1/1995 | Diaz et al. | 376/245 |
| 5,415,431 | * 5/1995 | Omura | 280/805 |
| 6,145,881 | * 11/2000 | Miller, III et al. | 280/806 |
| 6,161,439 | * 12/2000 | Stanley | 73/862.391 |

* cited by examiner

Primary Examiner—Max Noori

(57) ABSTRACT

A seat belt tension sensor has an anchor, a seat belt tension receiver, a moving arm force responder, and an arm sensor. The seat belt tension receiver applies force received from a seat belt to the moving arm force responder. The moving arm force responder is made of spring metal bent to have a base for receiving force and one or two arms that are urged to move by the received force. The arm sensor responds to the arm or arms by generating an electric signal. The anchor has an opening through which a seat belt, the seat belt tension receiver and the moving arm force responder pass. A cross member of the anchor spans the opening and withstands the large forces applied by the seat belt when the vehicle strikes an obstacle. An edge of the cross member is grooved to engage the base of the moving arm force responder in a way that provides low friction during flexing of the base. The base of the moving arm force responder operates as a low friction bearing for the movement of the seat belt tension receiver. A flexible suspension element made of spring metal operates as a second bearing and also operates as a preloading spring. In a preferred embodiment, the arm sensor comprises a semiconductor capacitance sensor responsive to the capacitance between two capacitor plates and two arms of a moving arm force responder.

32 Claims, 6 Drawing Sheets

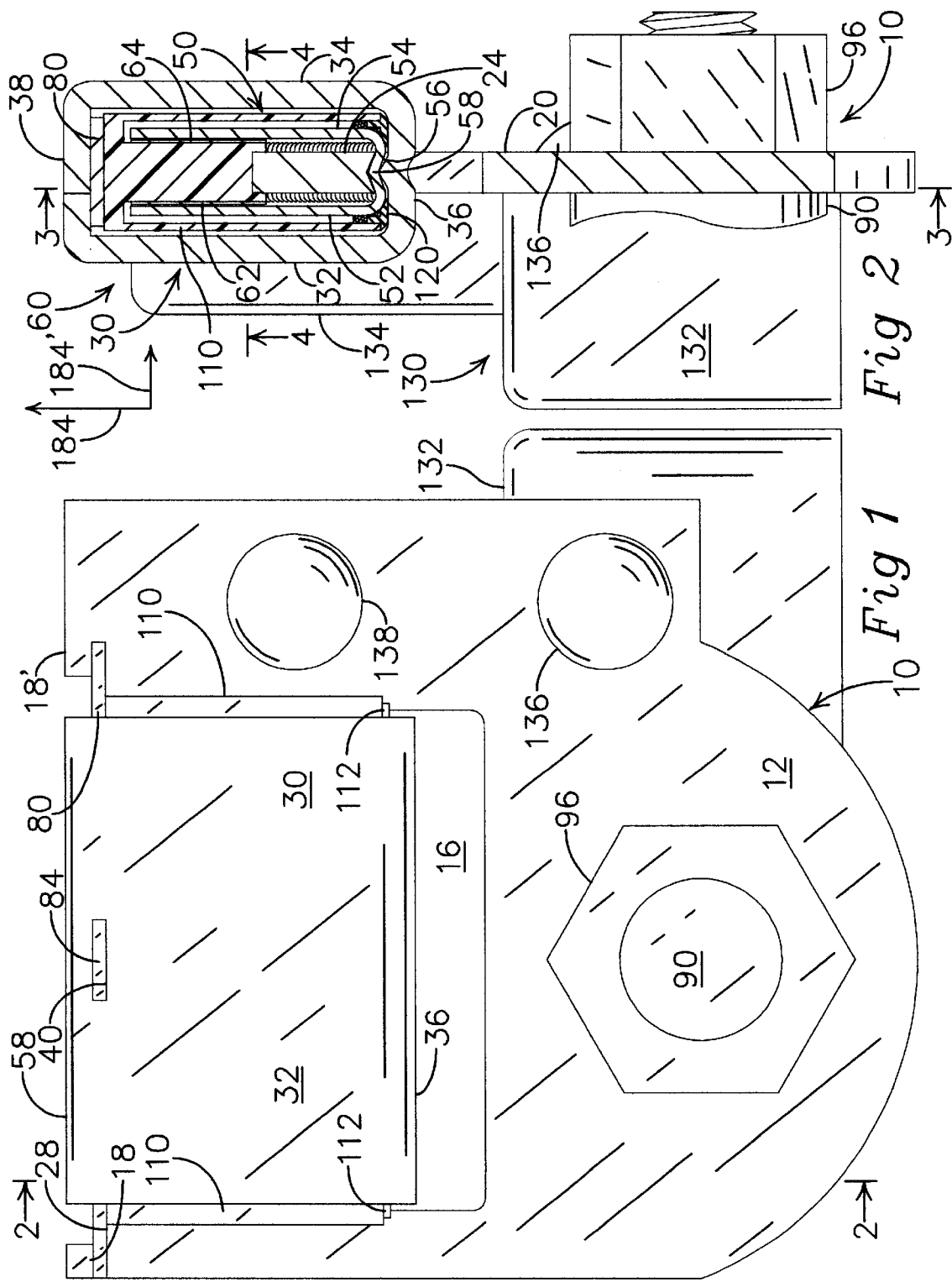

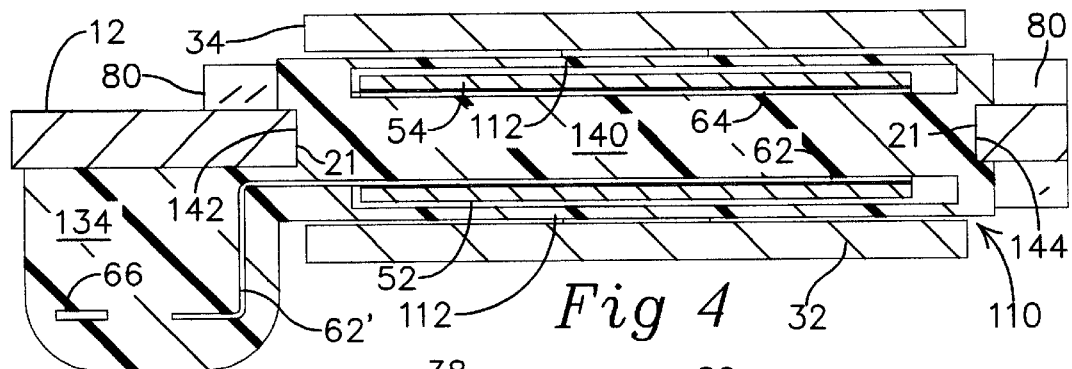
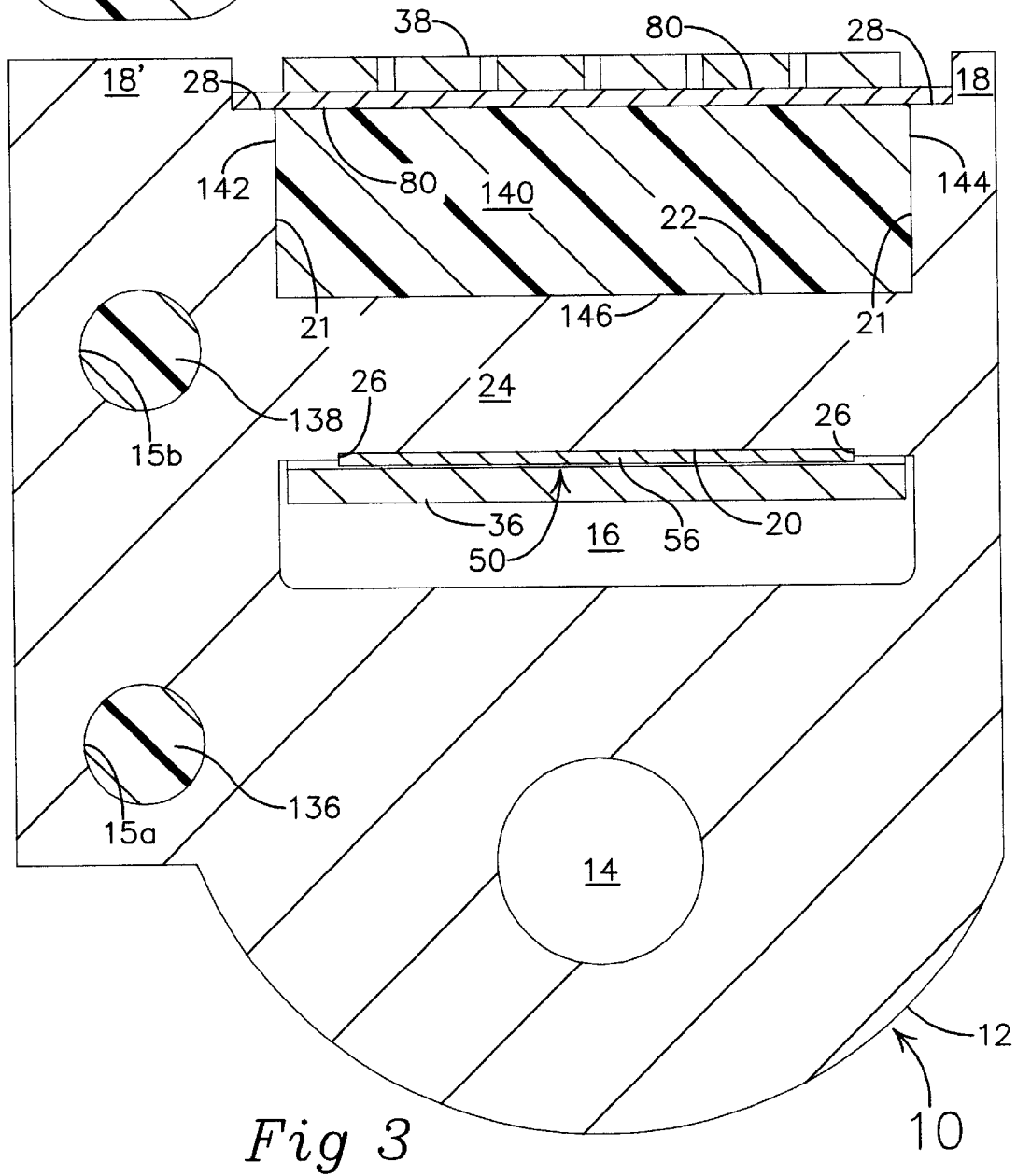

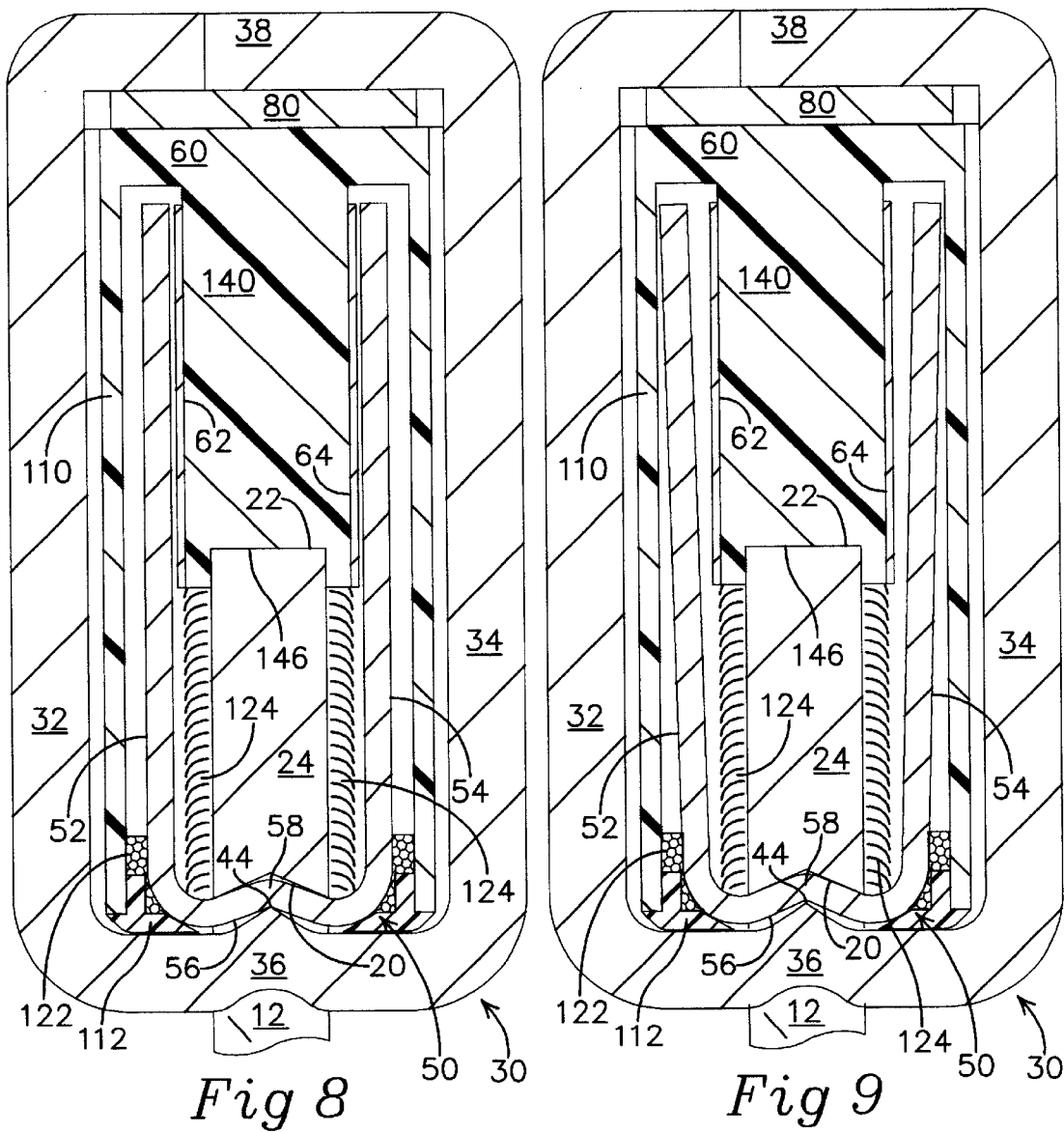

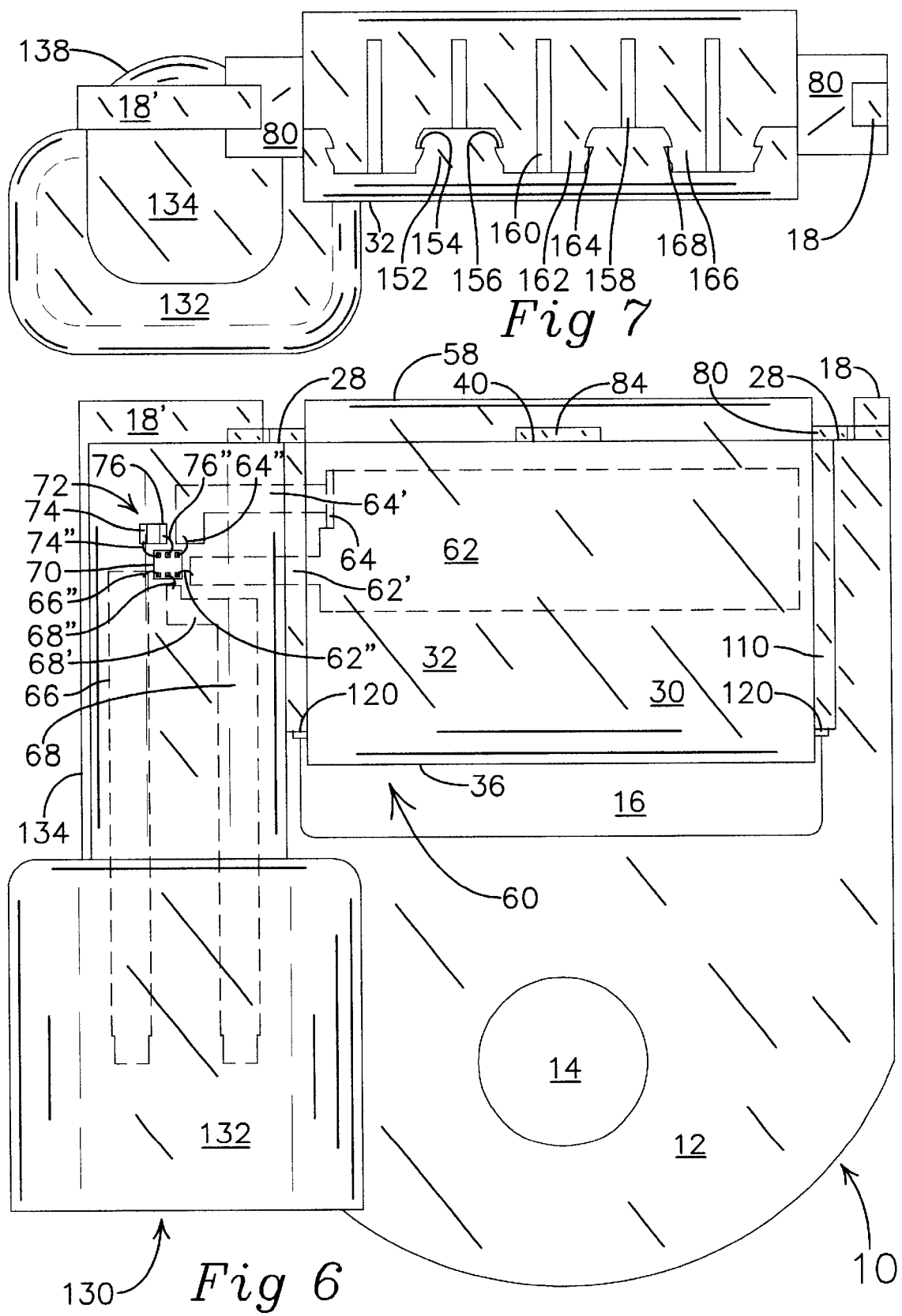

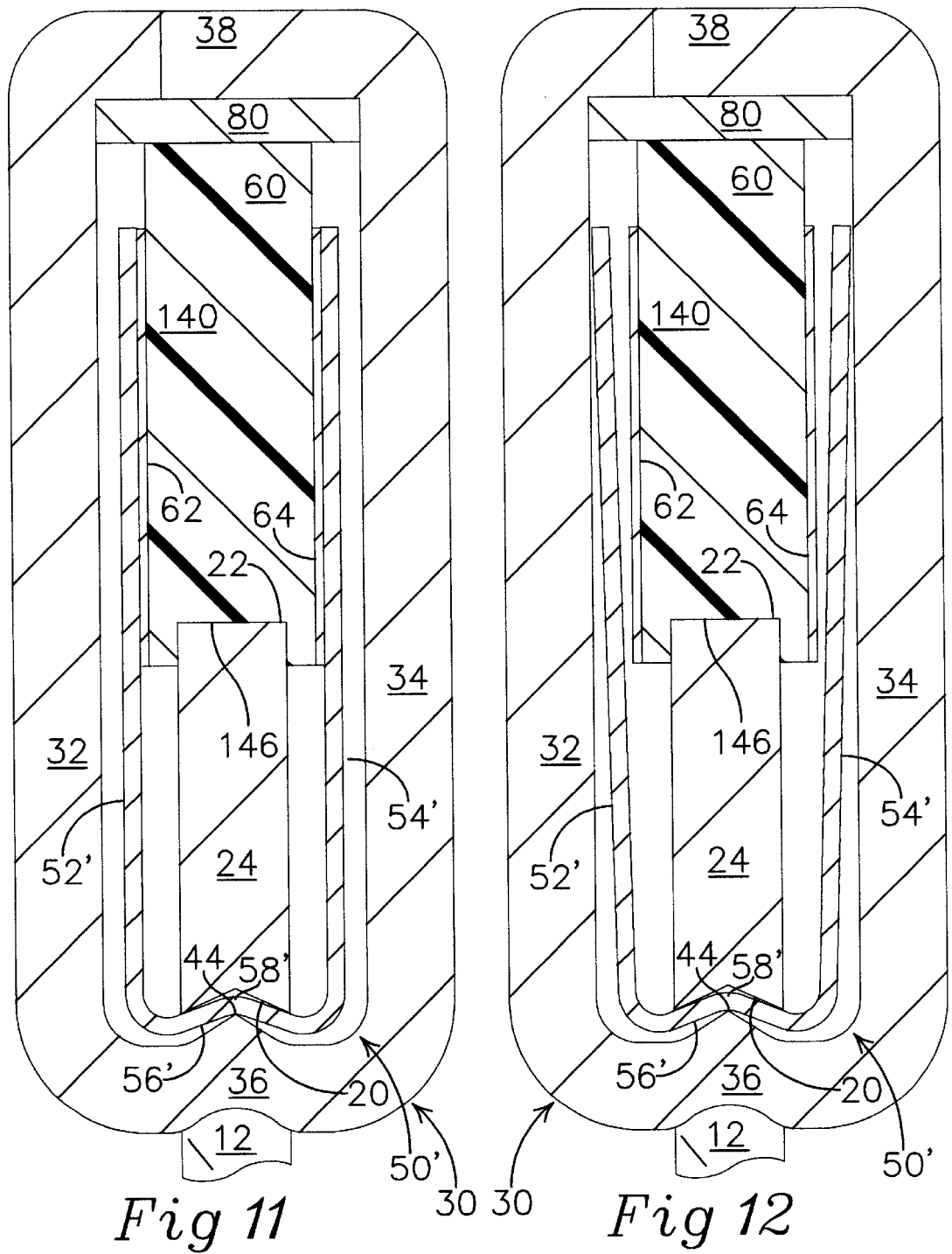

SEAT BELT TENSION SENSOR

This is a continuation-in-part of application Ser. No. 09/592,237 filed Jun. 12, 2000 and titled SEAT BELT TENSION SENSOR which is a continuation-in-part of application Ser. No. 09/565,703 filed May 4, 2000 and titled SEAT BELT TENSION SENSING SYSTEM which is a continuation-in-part of application Ser. No. 09/547,482 filed Apr. 12, 2000 and titled SEAT BELT TENSION SENSING SYSTEM which is a continuation-in-part of application Ser. No. 09/495,212 filed Jan. 31, 2000 and titled SEAT OCCUPANT WEIGHT SENSING SYSTEM.

FIELD OF THE INVENTION

This invention relates to systems that ascertain what is occupying a vehicle seat for deciding if and how air bags should be deployed.

BACKGROUND OF THE INVENTION

Air bags of occupant protection systems are expensive and in certain circumstances are dangerous. It is therefore desirable to avoid deployment when the seat is empty to save the cost of replacement. It is desired to avoid deployment when circumstances do not warrant deployment or when deployment might do more harm than good. It is particularly important to deploy the airbag judiciously when the seat is occupied by a child or by a very small adult. A system is desired to reliably distinguish an adult from a child even when the child is in a child seat and belts retaining the child seat are under substantial tension.

Occupant protection systems typically include a "sensor and diagnostic module" or "SDM" which senses the severity of a vehicle crash, monitors elements of the occupant protection system for proper operation, and deploys occupant protection devices. SDMs typically include a microprocessor, an accelerometer, an arming sensor, circuitry interconnecting the aforementioned components and switches for initiating deployment of the occupant protection devices. SDMs may be connected for receiving input from other sensors responsive to aspects of the occupancy of the seat.

To optimally deploy an airbag the SDM must take into account the weight of a seat occupant. Seat occupant weight sensors sense the weight of the occupant and communicate that weight to the SDM. With certain known seat occupant weight sensing systems seat belt tension affects the weight measurement therefore, for those systems, seat belt tension must be measured and communicated to a microprocessor of the SDM.

Capacitance sensing semiconductors are made by Quantum Research Group of Pittsburgh, Pa. and others. These devices sense small capacitances and certain of the designs provide output that varies linearly or monotonically with the capacitance being sensed.

A seat belt tension sensor must meet certain requirements: For accuracy and long life, friction in the mechanism must be minimized. The sensor must be accurate over a wide range of temperatures. The sensor must not rattle when the roads are rough. The seat belt tension sensor mechanism must withstand about one thousand pounds of seat belt force repeatedly without damage and not fracture or otherwise fail to restrain the occupant under about four thousand pounds of seat belt force, which could occur when the vehicle collides with an obstacle. No known design meets these requirements at a low cost.

Known force sensors must be protected from forces greatly in excess of the forces they are designed to measure. A seat belt tension sensor incorporating a known force sensor must protect the force sensor from the large forces that sometimes occur. Providing protection adds to the cost and complexity of the seat belt tension sensor. Accordingly, a force sensor that can measure forces on the order of thirty pounds while not being damaged by forces on the order of one thousand pounds is desired.

Of the known distance sensing means, capacitance sensing is advantageous for being inherently insensitive to temperature, not requiring permanent magnets, and being insensitive to the material used for sensing elements.

A general object of this invention is to provide a seat belt tension sensor offering low cost and superior performance which also overcomes certain disadvantages of the prior art.

SUMMARY OF THE INVENTION

In accordance with the invention, a new mechanism enables a low cost seat belt tension sensor. The mechanism comprises an anchor, a seat belt tension receiver, a moving arm force responder, and a preloading spring. The moving arm force responder comprises a base unitary with one or two arms. The tension receiver operates to apply force derived from seat belt tension to the base thereby causing the base to flex and the arm or arms to move. A sensor responsive to arm position provides an electric signal indicating seat belt tension.

Further, in accordance with the invention, the anchor comprises a flat plate having an opening for receiving a seat belt, the seat belt tension receiver and the moving arm force responder. A cross member of the anchor spans one side of the opening. The cross member is designed to withstand the largest seat belt forces encountered during a collision.

Further, in accordance with the invention an edge of the cross member has a groove with salient edges engaging the base of the moving arm force responder. Friction between the cross member and the moving arm force responder is minimized by designing the salient edges and the base of the moving arm force responder to minimize or eliminate relative movement therebetween while the base flexes, whereby long life and low hysteresis are achieved.

Further, in accordance with the invention, it has been discovered that a moving arm force responder comprising one or two arms unitary with a flexible base combined with a position sensor enables a superior and lower cost seat belt tension sensor that leads to a particularly advantageous design wherein the position sensor is responsive to capacitance.

Further, in accordance with the invention, the distance sensor comprises a semiconductor capacitance sensor responsive to capacitance between a capacitor plate and an arm of the moving arm force responder. When the base of the moving arm force responder flexes under the applied force and the arm moves, the capacitance between the capacitor plate and the arm of the moving arm force responder is changed. The change in distance is determined from the output of the capacitance sensor and the seat belt tension is computed therefrom.

Further, in accordance with the invention, an arm of the moving arm force responder moves sufficiently in response to forces less than thirty pounds to enable a capacitive distance sensor to respond to the movement. Under larger forces the base of the moving arm force responder "bottoms out" against the groove of the cross member, thereby being protected from being stressed to its yield stress.

Further, in accordance with the invention, the moving arm force responder is able to repeatedly withstand seat belt forces upwards of one thousand pounds applied to its flexible base without damage thereby remaining responsive to seat belt tension between zero and thirty pounds.

Therefore, the invention satisfies the unmet need for a low cost seat belt tension sensor responsive to small seat belt tensions while being able to withstand large seat belt tensions.

Further, in accordance with a preferred embodiment of the invention, the moving arm force responder comprises a pair of arms, and the distance sensor comprises two capacitor plates fixed with respect to the anchor. One capacitor plate is parallel to and in close proximity to one arm of the moving arm force responder. Whereupon, by the laws of Physics, there is a first capacitance therebetween. The other capacitor plate is parallel to and in close proximity to the other arm of the moving arm force responder, whereupon there is a second capacitance therebetween. The capacitance sensor senses the capacitance between the two capacitor plates, which is substantially the series capacitance of the aforementioned first and second capacitances. When seat belt tension is applied, the base of the tension receiver flexes to increase the distance between the arms which decreases the series capacitance.

Further, in accordance with the aforementioned preferred embodiment of the invention, the series capacitance is substantially determined by the distance between the arms of the moving arm force responder and not by the position of the capacitor plates, which are fixed with respect to the anchor. In other words, the series capacitance is not affected should the two capacitor plates become located to one side or the other of the central position between the arms. Accordingly, the measured capacitance is substantially dependent on the distance between the arms and not to where the capacitor plates happen to be.

Further, in accordance with the invention, the electric signal produced by the capacitance sensor is transmitted to elements of the occupant protection system to be used for estimating the weight of a seat occupant.

Further, in accordance with the invention, a low friction bearing between the seat belt tension receiver and the anchor comprises spring metal cut from sheet stock to engage the upper part of the tension receiver and the anchor. In its unstressed state the bearing is arched sufficiently that in its flat state it provides a preload force that keeps the anchor, moving arm force responder and tension receiver in contact with each other to prevent rattling.

Further, in accordance with the invention, the tension receiver is formed to have four sides which surround the cross member of the anchor, the moving arm force responder, and the middle portion of the preload spring.

Further, in accordance with the invention, the base of the moving arm force responder also operates as a second bearing between the tension receiver and the anchor. The second bearing is formed by a protrusion of the seat belt tension receiver engaging the middle of the base of the moving arm force responder. The aforementioned first bearing and the second bearing operate in concert to allow axial movement and prevent cross axis movement. The two bearings together have sufficiently low friction that when seat belt tension is applied at large angles to the seat belt tension sensor axis the tension sensor accurately measures the axial component of the seat belt tension.

Further, in accordance with the invention, all electrical components including the distance sensor are incorporated into a single plastic molding. The molding may also include a housing that isolates the moving arm force responder and capacitor plates from contamination from outside the seat belt tension sensor.

Further, in accordance with the invention, the distance sensor is manufactured as an assembly unitary with an electrical connector. This results in particularly simple manufacture in which all electrical elements are manufactured into a single assembly.

A complete understanding of this invention may be obtained from the description that follows taken with the accompanying drawings.

DESCRIPTION OF THE DRAWINGS

FIG. 1 shows a frontal view of the seat belt tension sensor of the invention.

FIG. 2 shows a side view of the seat belt tension sensor of the invention illustrated in FIG. 1 partially in section taken at section 2—2 of FIG. 1. FIG. 2 also illustrates axial and cross axis directions.

FIG. 3 shows the seat belt tension sensor of the invention illustrated in FIG. 1 partially in section taken at section 3—3 of FIG. 2.

FIG. 4 shows the seat belt tension sensor of the invention illustrated in FIG. 1 partially in section taken at section 4—4 of FIG. 2.

FIG. 5 shows in a plan view the preload spring which is also the upper bearing of the seat belt tension sensor of the invention.

FIG. 6 shows a view of the back of the seat belt tension sensor of the invention with certain electrical parts illustrated by hidden lines.

FIG. 7 shows a view of the top of the seat belt tension sensor of the invention.

FIG. 8 shows an enlargement of the top portion of the seat belt tension sensor of the invention as illustrated in FIG. 2.

FIG. 9 shows the top portion of the seat belt tension sensor of the invention illustrated in FIG. 8 when large seat belt tension is applied.

FIG. 11 shows the top portion of a second embodiment the seat belt tension sensor of the invention when no seat belt tension is applied.

FIG. 12 shows the top portion of the seat belt tension sensor of FIG. 11 when seat belt tension exceeds a predetermined tension.

BEST MODE FOR CARRYING OUT THE INVENTION

Figure 10:
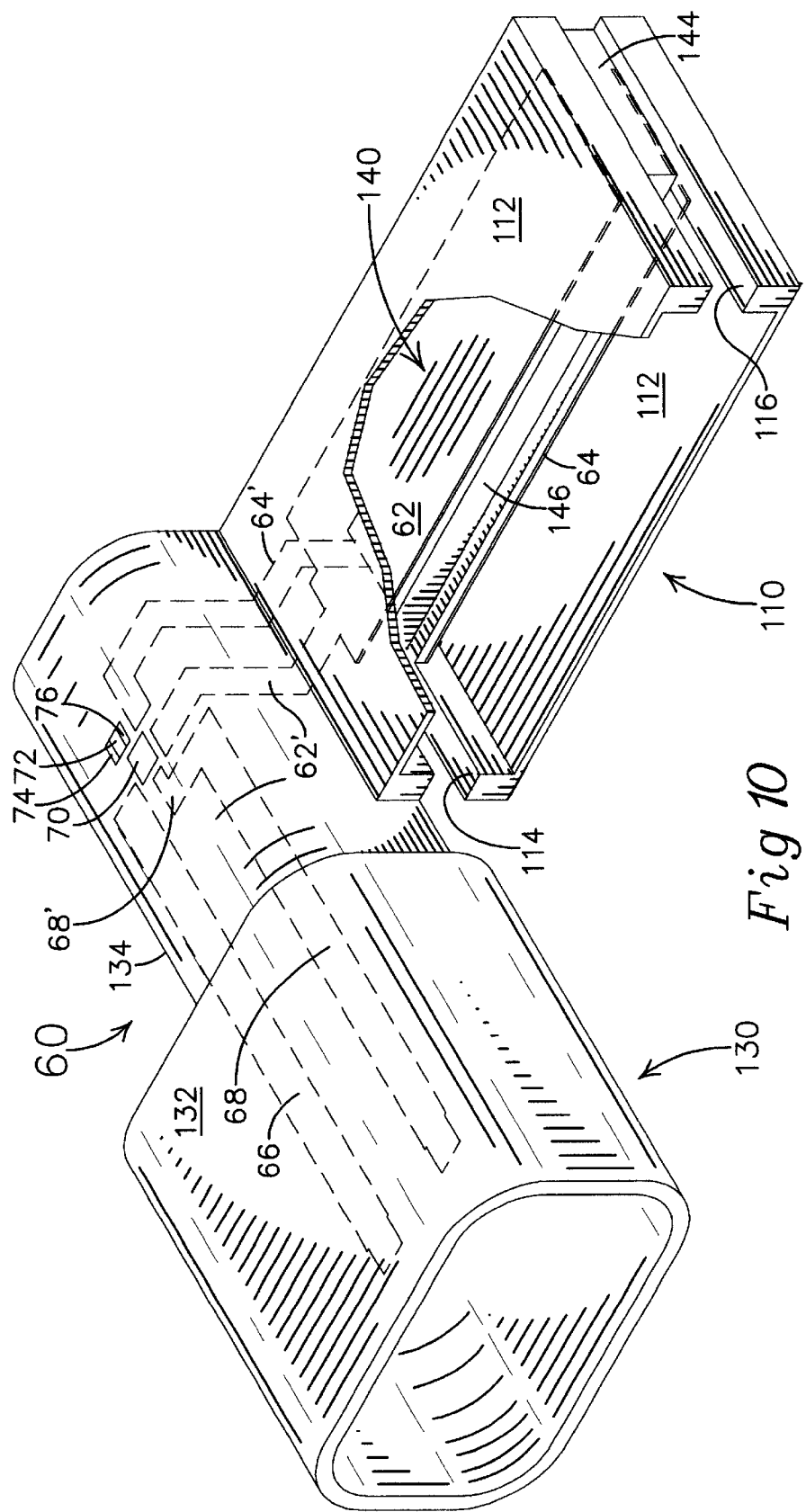
FIG. 10 shows a perspective view of the plastic molding of the seat belt tension sensor of the invention with part of the enclosure cut away, and with certain of the electrical parts illustrated by hidden lines.

Proceeding first with reference to FIGS. 2 and 6, seat belt tension sensor 10 provides a signal through connector pins 66 and 68 to an occupant weight sensing system (not illustrated) indicating the axial component of tension in a seat belt. Seat belt tension sensor 10 comprises anchor 12, seat belt tension receiver 30, moving arm force responder 50, connector and distance sensor 60, and bearing and preload spring 80. Anchor 12 is rotatably attached to shouldered stud 90. Shouldered stud 90 is attached to a part of the vehicle able to withstand large forces. Tension receiver 30 receives force from a seat belt and applies the axial component of the received force to moving arm force responder 50. The arms of moving arm force responder 50 move farther apart when force is applied. Connector and distance sensor 60 responds to the distance between the arms of moving arm force responder 50 by providing the aforementioned electric signal. Preload spring 80 operates as a bearing to prevent friction between tension receiver 30 and anchor 12 in the presence of cross axis forces and also provides preload force to prevent rattles. ("cross axis" is used herein to denote directions perpendicular to the axis indicated by arrow 184 in FIG. 2)

In a preferred design, connector and distance sensor 60 comprises a capacitance sensor 70 responsive to the distance between the arms 52 and 54 of moving arm force responder 50. Alternately, other distance sensing means may be selected by those skilled in the relevant arts. Many known eddy current proximity sensor designs are suitable for use in the locations of capacitor plates 62 and 64 for sensing the distance to arms 52 and 54. In another alternate design a toroidal permanent magnet is attached to arm 52 and a magnetic field sensor responds to the distance to the magnet. It will be appreciated as the description proceeds that the invention may be implemented in different embodiments.

Continuing now the description of seat belt tension sensor 10 with reference to FIGS. 1 through 10. Anchor 12 is a plat having openings 14 15a, 15b, and 16, two preload spring retainers 18 and 18' rising from ledges 28, and edges 20, 21, and 22. FIG. 3 illustrates the aforementioned openings, retainers, ledges, and edges. Opening 14 accepts shouldered stud 90 for retention by nut 96. Nut 96 tightens against a shoulder (not illustrated) of shouldered stud 90 which enables rotation of anchor 12 about the axis of shouldered stud 90.

Openings 15a and 15b of anchor 12 snugly engage headed fasteners 136 and 138 of connector and distance sensor 60. Opening 16 provides space for passage of a seat belt, force concentrator 36 of belt tension receiver 30, and base 56 of moving arm force responder 50. Opening 16 has a grooved edge 20 for engaging base 56 of moving arm force responder 50. Grooved edge 20 and edge 22 define a cross member 24 designed to withstand the largest forces expected during a collision. The groove of edge 20 ends at abutments 26 which keep base 56 of moving arm force responder 50 centrally positioned on edge 20. Preload spring retainers 18 and 18' and shelves 28 locate and support preload spring 80. Edges 21 and 22 hold capacitor plate carrier 140 in place.

Anchor 12 is preferably cut from steel sheet. Grooved edge 20 is preferably formed by using a cutting tool to achieve a precisely shaped edge. The salient edges of grooved edge 20 are designed to engage base 56 of moving arm force responder 50 over an area sufficient to assure that metal does not yield when forces from seat belt tension reach about one thousand pounds. (Please refer to FIG. 9 for illustration of contact between grooved edge 20 and base 56 of moving arm force responder 50 during large seat belt tension.) HSLA "Navy" steel is believed to be the preferred material for anchor 12 because of its extensive use for seat belt anchors. About ten square millimeters of engagement is appropriate if HSLA steel is used. Other materials and manufacturing methods for making anchor 12 may be substituted by those skilled in the relevant arts.

Seat belt tension receiver 30 receives seat belt tension force and transmits the axial component of the force received from the seat belt to moving arm force responder 50. Seat belt tension receiver 30 is preferably cut from sheet of the same steel as anchor 12 and bent to form four sides of a rectangular surround. Seat belt tension receiver 30 comprises sides 32 and 34, force concentrator 36, and top 38. Sides 32 and 34 each have an opening 40 or 40' respectively for receiving a tab 84 of preload spring 80. Force concentrator 36 has a protrusion 44 for applying force to the middle of base 56 of moving arm force responder 50. Protrusion 44 is preferably as sharp as it can be within the constraint of the need for sufficient area of engagement to prevent overstressing the steel when the aforementioned force of about one thousand pounds is applied. Other materials and manufacturing methods for making seat belt tension receiver 30 may be substituted by those skilled in the relevant arts.

When tension receiver 30 is made, the bends where sides 32 and 34 meet force concentrator 36 are only partially completed to enable side 34 to be inserted through opening 16 during final assembly followed by completing the incomplete bends. Top 38 of seat belt tension receiver 30 comprises short barbed heads 152 with barbs 154 unitary with side 32 and longer barbed heads 162 and 166 with barbs 164 and 168 respectively unitary with side 34. Slots 158 and 160 between long barbed heads 162 and 166 provide flexibility allowing barbed heads 162 and 166 to pass shorter barbed heads 152 when the aforementioned incomplete bends are completed. After passing each other, barbs 164 and 168 snap into their illustrated positions whereupon the barbs engage to lock the two parts of top 38 together to hold sides 32 and 34 together. Other means for joining the sides 32 and 34 at top 38 may be substituted by those skilled in the relevant arts.

Moving arm force responder 50 comprises flat spring material formed into a "U" shape having two arms 52 and 54 and a base 56 with a peak 58. Base 56 is shaped to both engage the salient edges of grooved edge 20 of anchor 12 and, also, to receive force from protrusion 44 of seat belt tension receiver 30. The reader is referred to FIGS. 8 and 9 for illustrations of the aforementioned features of moving arm force responder 50.

The angle at peak 58 between the two sides of base 56 is determined to minimize relative movement between base 56 and the salient edges of grooved edge 20 when varying seat belt tension causes base 56 to flex. For appreciating that there is an optimum angle at peak 58 it may be helpful to consider that if there were no angle, i.e. if base 56 were flat, the points on base 56 where there is contact with the two salient edges of grooved edge 20 would move away from each other placing different points on the surface of base 56 in contact with the salient edges when the seat belt tension increases and, similarly, would move inward when the tension decreases. Depending on the angle at peak 58, the illustrated shape of peak 58 reduces, eliminates, or reverses the direction of the inward and outward movement. The preferred design is to choose an angle that minimizes the wear of the points of contact over the life of the vehicle. The angle that minimizes or eliminates relative movement is believed to also be the angle that minimizes wear which is preferably determined by using any of the available finite element computer codes for calculating stresses in materials, once the thicknesses of the parts and the properties of the material are known.

The salient edges of edge 20 move slightly inward and outward by virtue of slight flexing of the triangular support underlying the salient edges. The flexing of the triangular support should be taken into account in determining the dimensions that minimize friction and wear. Therefore, modeling should take into account the combination of base 56 of moving arm force responder 50 and the support underlying grooved edge 20 using one of the many aforementioned available finite element modeling computer codes.

Moving arm force responder 50 is preferably made by bending hardened spring steel into a "U" shape and baking it to relieve stress left by bending. For thicker sections a different process may be required. It may be desired to make moving arm force responder 50 of material of such thickness that a small radius at the bends where the arms 52 and 54 join base 56 cannot be achieved with hardened spring material. Such thick material may be required to minimize movement of arms 52 and 54 to better utilize the capabilities of a capacitance distance sensor. For thicker sections an alternate method for making moving arm force responder 50 is to bend annealed spring steel into the required shape and then temper it, Alternately, a lower carbon steel or a stainless steel of a hardness that can be bent as required may be used. Beryllium copper offers the advantage, at higher cost, of enabling forming followed by heat treatment at modest temperatures to obtain spring temper. Other materials and manufacturing methods for making moving arm force responder 50 may be selected by those skilled in the relevant arts.

Connector and distance sensor 60 operates to determine the distance between arm 52 and arm 54 by sensing the capacitance between capacitor plates 62 and 64. Connector and distance sensor 60 comprises: electrical connector 130 having connector pins 66 and 68, shroud 132, extension 134, two headed fasteners 136 and 138; capacitor plate carrier 140 having capacitor plates 62 and 64, and grooves 142, 144, and 146; semiconductor capacitance sensor 70; reference capacitor 72 having connection points 74 and 76; electrical conductors 62' and 64' for making electrical connection with capacitor plates 62 and 64 respectively; pin extension 68' for making electrical connection with connector pin 68; and wire bonds 62", 64", 66", 68", 74" and 76". Headed fasteners 136 and 138 are cylindrical bosses molded to fit snugly into openings 15a and 15b of anchor 12 onto which heads are formed after assembly is complete.

Wire bonds 62" and 64" connect capacitor plates 62 and 64 with pads on semiconductor capacitance sensor 70 through electrical conductors 62' and 64' and respectively. Wire bonds 66" and 68" connect connector pins 66 and 68 (through extension 68') respectively with pads on semiconductor capacitance sensor 70. Wire bonds 74" and 76" connect contact points 74 and 76 respectively of reference capacitor 72 with pads on semiconductor capacitance sensor 70.

Capacitor plate carrier 140 is formed when connector and distance sensor 60 is molded. Grooves 142, 144, and 146 are sized to snugly engage edges 21 and 22 of anchor 12. A conformal coating may be applied to insulate capacitor plates 62 and 64 to eliminate the need for capacitance sensor 70 to be able to tolerate grounding of the capacitor plate. Alternately, capacitor plates may be made of aluminum and insulated by anodizing. Other insulating means may be selected by those skilled in the relevant arts.

Connector and distance sensor 60 may also comprise enclosure 110 and cover 120 for enclosing arms 52 and 54 and the capacitor plates 62 and 64. Enclosure 110 is a rectangular box with sides 112, an open end, and cutouts 114 and 116 sized to snugly fit cross member 24 of anchor 20. Cover 120 may have an opening to allow protrusion 44 of seat belt tension receiver 30 to contact base 56 of moving arm force responder 50 or it may not have such an opening and be interposed between protrusion 44 and base 56. In the Figures the opening is present. A liquid tight seal around moving arm force responder 50 may or may not be desired. The primary purpose of enclosure 110 and cover 120 is believed to be to keep insects from building nests likely to interfere with operation. Keeping insects out only requires enclosure 110 to be resistant to insects but not liquid tight.

If a liquid tight seal is required, sealant 122 is placed in cover 120 to make a seal where cover 120 meets enclosure 110, and sealant fillets 124 and 126 (not illustrated) are provided at cutouts 114 and 116 respectively where enclosure 110 intersects cross member 24. In addition to assuring well formed fillets 124 and 126 to obtain a seal the process must not make the thickness of the sealant 122 at cover 120 so thick that it excessively resists movement of the base and arms of moving arm force responder 50. Other materials and manufacturing methods for making connector and distance sensor 60 may be selected by those skilled in the relevant arts.

If cover 120 has no opening it is made of a plastic suitable for withstanding the forces up to one thousand pounds that might repeatedly occur. PET or PEN sheet materials vacuum formed into the required cup shape are believed to be preferred materials for cover 120. It is believed that a preferred sealant may be selected from the many low durometer (i.e. approximately 30 Shore A) two component polyurethane sealants available commercially for many purposes. Master Bond of Hackensack, N.J. provides a product designated EP30D12 which is believed to be suitable. H.B. Fuller of Saint Paul Minn. provides a line of foamed in place materials under the trade name Purform, a low durometer formulation of which is also believed to be suitable.

Connector and distance sensor 60 is preferably made by injection molding a suitable molding compound around the electrical components of connector and distance sensor 60. One process is described in the following: (1) In preparation for molding, capacitor plates 62 and 64, electrical conductors 62' and 64', connector pins 66 and 68, and extension 68' are cut and formed from a sheet of an electrically conductive material such as gilding metal and held in their final positions relative to each other. (2) The electrical components of connector and distance sensor 60 are electrically connected together by wire bonding. (3) Sufficient potting material is flowed over semiconductor capacitance sensor 70, reference capacitor 72 and the wire bonds 62", 64", 66", 68", 74" and 76" to prevent damage during the injection molding process. (4) The assembly is placed in a mold and plastic molding compound is injected to form connector and distance sensor 60. A preferred molding compound for connector and distance sensor 60 is a mineral or glass fiber filled polyphenylene sulfide molding compound because it makes a strong and dimensionally stable part. Rounded heads are formed on headed fasteners 136 by ultrasonic forming or heat staking whereby electrical connector 130 is attached to anchor 12.

The following modification of the aforementioned process may be substituted to more accurately control the location of capacitor plates 62 and 64 relative to grooves 142, 144, and 146. Prior to injection molding, capacitor plates 62 and 64 are glued to accurately spaced sides of a rectangular spacer. The spacer is preferably porous to enable the molding compound to penetrate the pores of the spacer during injection molding to form a unitary molding. Other materials and methods for making connector and distance sensor 60 may be substituted by those skilled in the relevant arts.

Two bearings enable seat belt tension receiver 30 to move axially with minimal friction over a limited range of movement with respect to anchor 12. The first bearing comprises preload spring 80. Preload spring 80 is preferably cut from spring metal sheet to have two notches 82 for engaging preload spring retainers 18 and 18' of anchor 12 and two tabs 84 for engaging openings 40 and 40' of tension receiver 30. In its unstressed shape preload spring 80 is slightly arcuate so that when it is flat as illustrated in FIG. 3 it applies a force to top 38 of tension receiver 30, the force being sufficient to keep force concentrator 36 of tension receiver 30, base 56 of moving arm force responder, 50 and grooved edge 20 of anchor 12 in contact with each other to prevent rattling during such as driving over rough roads. The second bearing comprises base 56 of moving arm force responder 50 which flexes to allow axial movement of tension receiver 30. Other bearings may be substituted by those skilled in the relevant arts.

Shouldered stud 90 comprises a shoulder (not illustrated) of length and diameter determined to mate with opening 14 of anchor 12 and enable rotation of anchor 12 when anchor 12 is retained by nut 96.

A preferred method for manufacturing seat belt tension sensor 10 comprises the following assembly steps: (1) moving arm force responder 50 is placed over cross member 24 and the combination is placed in a fixture designed to hold the two parts in their intended final positions. (2) connector and distance sensor 60 is put onto anchor 12 so that grooves 142, 144 and 146 engage edges 21 and 22 of anchor 12. (3) Optionally, sealant 122 and sealant fillets 124 and 126 are placed and cover 120 is installed. (4) Preload spring 80 is installed on preload spring retainers 18 and 18' of anchor 12. (5) Side 34 of seat belt tension receiver 30 is passed through opening 16. (6) While preload spring 80 is kept in the flat condition illustrated in FIG. 3, sides 32 and 34 are brought together by completing the bends that were previously only incompletely made. This places opening 40 of side 32 onto a tab 84 of preload spring 80 and opening 40' of side 34 onto the other tab 84 of preload spring 80. (7) Force is applied at top 34 to bring shorter barbed heads 152 into engagement with longer barbed heads 162 and 166 to close the four sides of seat belt tension receiver 30 and make the assembly permanent. Other manufacturing methods for making seat belt tension sensor 10 may be substituted by those skilled in the relevant arts.

The materials and methods referred to hereinabove are only suggestions and others may be substituted by those skilled in the relevant arts.

The operation of the seat belt tension sensor 10 of the invention will now be described with reference to FIGS. 1 through 10. In operation of the system, when a seat belt applies force from seat belt tension to force concentrator 36 of tension receiver 30, the axial component of the force from seat belt tension is applied by protrusion 44 of tension receiver 30 to the underside of peak 58 of base 56 of moving arm force responder 50 causing the salient edges of edge 20 of anchor 12 to apply an equal and oppositely directed force to base 56. Base 56 of moving arm force responder 50 flexes slightly under the stress which causes arms 52 and 54 to move farther from each other which decreases the capacitance between capacitor plates 62 and 64.

Semiconductor capacitance sensor 70 senses the capacitance between capacitor plates 62 and 64. To a first approximation, the capacitance between capacitor plates 62 and 64 varies inversely with the sum of the thicknesses of the two air gaps between capacitor plate 62 and arm 52 and between capacitor plate 64 and arm 54. Accordingly, the capacitance measured by semiconductor capacitance sensor 70 is a measure of a sum of distances which increases as base 56 of moving arm force responder 50 is increasingly stressed. The flexing of base 56 of moving arm force responder 50 is proportional to the force applied by protrusion 44 of tension receiver 30 to the middle of base 56 of moving arm force responder 50. Accordingly, the output of semiconductor capacitance sensor 70 is a measure of the force being applied by tension receiver 30 to base 56 of moving arm force responder 50. The output of semiconductor capacitance sensor 70 is transmitted through connector pins 66 and 68 and other conductors to the microprocessor of the occupant protection system (not illustrated) of the vehicle which indicates to the processor the force being applied to moving arm force responder 50.

The force being applied to base 56 of moving arm force responder 50 is determined by the following process: The microprocessor or internal circuitry of the capacitance sensor: (1) measures the capacitance between capacitor plates 62 and 64, (2) From a table stored in the capacitance sensor after seat belt tension sensor 10 is assembled, the capacitance sensor obtains the axial component of the seat belt tension force the seat belt is applying to tension receiver 30 and transmits that measurement of the seat belt tension to the micro-processor of the occupant protection system of the vehicle.

When forces up to such as one thousand pounds are applied to base 56 of moving arm force responder 50 base 56 flexes but is not stressed beyond its yield stress. At a predetermined force that is preferably less than the aforementioned one thousand pounds, base 56 of moving arm force responder 50 flexes sufficiently that the angle at peak 58 is equal to the angle at the middle of grooved edge 20 of anchor 12 whereupon base 56 abuts the bottom of the grooved edge 20 of cross member 24 over much or most of its area and grooved edge 20 prevents further flexing of base 56 of moving arm force responder 50 and, thereby, the stress in base 56 is limited to a stress below its yield stress. FIG. 9 illustrates base 56 engaging the bottom of the groove 20 of cross member 24 over much of its area for limiting the stress experienced by base 56.

When the seat belt tension applied to seat belt tension sensor 10 has a cross axis component ("cross axis" is used herein to denote directions perpendicular to the axis indicated by arrow 184 in FIG. 2) in a direction such as the direction indicated by arrow 184' the cross axis force acts principally on the top of tension receiver 30 near bearing and preload spring 80 and urges the top of tension receiver 30 in the direction of the cross axis force. Movement in a cross axis direction is resisted by preload spring 80 because preload spring retainers 18 and 18' of anchor 12 fix the location of preload spring 80, and openings 40 and 40' in sides 32 and 34 engage tabs 84 of preload spring 80. Cross axis movement of seat belt tension receiver 30 is further prevented by engagement between protrusion 44 from force concentrator 36 of tension receiver 30 and the underside of peak 58 of base 56 of moving arm force responder 50 which, in turn, engages grooved edge 20 of anchor 12. Accordingly, there are two bearings providing low friction movement in the axial direction indicated by arrow 184 whereby the output of seat belt tension sensor 10 is minimally affected by friction. The low friction enables seat belt tension sensor 10 to be an accurate sensor of the axial component of seat belt force and, further, to be minimally affected by seat belt tension force applied by the seat belt in cross axis directions.

In a preferred design the semiconductor capacitance sensor 70 is a semiconductor sensor of the type that includes programmable memory elements in which values of parameters can be stored by inputting digital signals specifying the values of the parameters. The parameters are determined and stored after the seat belt and tension sensor 10 is completely assembled. The parameters are determined by performing a procedure such as the following: After the seat belt tension sensor is assembled it is connected to test apparatus that reads the output of connector and distance sensor 60 while no force is applied to seat belt tension sensor 10. Then a force simulating a seat belt tension of such as ten pounds is applied between tension receiver 30 and anchor 12 and the output of connector and distance sensor 60 is again read. Based on the readings at the applied forces of zero and ten pounds and knowledge of the inner workings of capacitance sensor 70 parameters are stored in semiconductor capacitance sensor 70 that cause it to output a low voltage such as one volt when no tension is applied and a high voltage such as four volts when a seat belt tension such as thirty pounds is applied, thereby compensating after assembly is complete for manufacturing variations in preload spring tension, capacitance between capacitor elements, resiliency of the material of moving arm force responder 50, and other variables.

Other distance sensing means besides capacitance sensing may be substituted. For example, to provide a first alternate distance sensing means, capacitor plates 62 and 64 are replaced by thin sheets of permanent magnet material magnetized perpendicular to the surface of the sheets. Semiconductor capacitance sensor 70 and reference capacitance 72 are removed. A magnetic field sensor such as a Hall effect sensor or a magnetoresisitive sensor is insert molded into carrier 140 where its sensing area is centrally located between the two sheets of permanent magnet material. The magnetic field sensor is connected to connector pins 66 and 68. Moving arm force responder 50 would be made of a high permeability material such as silicon steel of the type used for transformer cores. The magnetic field sensor senses a magnetic field approximately proportional the inverse of the distance between the two arms of moving arm force responder 50 and transmits a signal responsive to that distance to the occupant protection system of the vehicle.

A second alternate electromagnetic distance sensor results from removing the permanent magnet materials and Hall effect sensor from the design described in the preceding paragraph and placing an inductive coil in the central plane of carrier 140 and providing an inductance sensor connected to measure the inductance of the coil. The inductance of the coil is approximately proportional the inverse of the distance between the two arms of moving arm force responder 50. The inductance sensor, therefore, transmits a signal responsive to that distance to the occupant protection system of the vehicle.

A difference between the two aforementioned alternate distance sensing means and capacitive distance sensing is that the capacitive design is sensitive to very small distances between the arms of moving arm force responder 50 and capacitor plates 62 and 64 and respond to very small movements whereas the electromagnetic measuring systems perform better when measuring larger movements. These differences may make one or the other of the distance sensing designs advantageous depending on the requirements the seat belt tension sensing system must meet.

A second embodiment of the seat belt tension sensor of the invention will now be described with reference to FIGS. 11 and 12. The second embodiment may be preferred when the seat belt tension sensor is required to produce a binary signal indicating tension is below or above a predetermined seat belt tension, for instance, 7 pounds. The embodiment illustrated in FIGS. 11 and 12 is similar to the embodiment illustrated in FIGS. 1 through 10 but there are two changes. Firstly, the design is simplified by omission of enclosure 140. This is done to illustrate a simplified design. Whether or not housing 110 and cover 120 are included depends on whether or not fluid penetration, insect nesting, or debris accumulation must be guarded against. Secondly, and significantly, moving arm force responder 50' comprising arms 52' and 54', base 56' and peak 58' replaces moving arm force responder 50 of FIGS. 1 through 9, Moving arm force responder 50' is made of thinner material than moving arm force responder 50 and is bent in the manner of the bending of a binder type paper clip so that when no seat belt force is applied, arms 62' and 64' are pressing against capacitor plates 62 and 64. Preferably, there is insulation such as a conformal coating (not illustrated) on the outside surface of capacitor plates 62 and 64 so there is no electrical contact.

The operation of the second embodiment of the seat belt tension sensor of the invention will now be described with reference to FIGS. 11 and 12. When the seat belt tension is less than a predetermined seat belt tension, the arms 52' and 54' remain in the position illustrated in FIG. 11 wherein they rest against capacitor plates 62 and 64. The effect of seat belt tensions less than the predetermined seat belt tension is to reduce the force applied by the arms 52' and 54' to capacitor plates 62 and 64 and there is little movement and little change in the capacitance measured between capacitor plates 62 and 64.

When seat belt tension is less than the predetermined seat belt tension, connector and distance sensor 60 responds to the large capacitance between plates 62 and 64 by providing an electric signal to connector pins 66 and 68 indicating tension receiver 30 is applying less that the predetermined force to moving arm force responder 50.

When seat belt tension exceeds the predetermined seat belt tension it causes a force to be applied to base 56' sufficient to overcome the stress formed into base 56' during its manufacture and cause it to flex. Because the material is thin, a small increase in force over the predetermined force causes arms 52' and 54' to move away from capacitor plates 62 and 64 toward the positions illustrated in FIG. 12. This causes a substantial reduction in the capacitance measured between capacitor plates 62 and 64 which is sensed by capacitance sensor 70.

When arms 52' and 54' are in the positions illustrated in FIG. 12, connector and distance sensor 60 responds to the lower capacitance between capacitor plates 62 and 64 by providing an electric signal to connector pins 66 and 68 indicating tension receiver 30 is applying a force greater that the predetermined force to moving arm force responder 50. Connector and distance sensor 60 of the second embodiment may be the same as for the first embodiment or it may be modified to present an output signal having only two levels. If connector and distance sensor 60 of the second embodiment is the same as for the first embodiment then the microprocessor of the occupant protection system is programmed to make the binary distinction between signals indicating less than the predetermined force and signals indicating more than the predetermined force.

Although the description of this invention has been given with reference to particular embodiments, it is not to be construed in a limiting sense. Many variations and modifications will now occur to those skilled in the art. For a definition of the invention reference is made to the appended claims.

What is claimed is:

1. In an occupant protection system of a vehicle of the type comprising processing means for deploying occupant protection means, a seat belt tension sensor comprising:

an anchor, a force sensing means, and a tension receiver, and wherein:
   said anchor comprising a plate comprising an opening spanned by a cross member,
   said tension receiver being adapted for receiving force from a seat belt, said tension receiver also being connected with said force sensing means for applying force thereto,
   said force sensing means being connected with said cross member for applying force thereto,
   said force sensing means being adapted for generating an electric signal responsive to said force received from said tension receiver when said force received from said tension receiver is in the range of zero to a predetermined force, said predetermined force being less than one thousand pounds, and including means for protecting said force sensing means when said force received from said seat belt is greater than said predetermined force.

2. The invention as defined by claim 1 and wherein said tension receiver being movable in the direction of an axis, and including:
   means for selecting from said force received from a seat belt the component of said force received from a seat belt having the direction of said axis, and wherein:
   said tension receiver being adapted to apply said selected component of said force through said connection to said force sensing means.

3. The invention as defined by claim 2 wherein:
said means for selecting said axial component comprising bearing means providing low friction movement of said tension receiver in the direction of said axis.

4. The invention as defined by claim 3 and wherein:
said bearing means comprising flexible suspension means engaging said anchor and said tension receiver.

5. The invention as defined by claim 4 wherein:
said flexible suspension means providing a preload force urging said tension receiver in the direction of said axis.

6. The invention as defined by claim 1 wherein:
said force sensing means comprising a flexible member,
said flexible member being connected with said tension receiver for receiving force therefrom, and
said flexible member being adapted to flex in response to said force received from said tension receiver.

7. The invention as defined by claim 6 wherein:
said electric signal being a measure of said flexing of said flexible member.

8. The invention as defined by claim 7 and including:
a capacitance sensing means, two capacitor elements, and means linking a said capacitor element with said flexible member for causing relative movement between said capacitor elements upon said flexing, and wherein:
   said capacitance sensing means being responsive to capacitance between said capacitor elements by generating said electric signal.

9. The invention as defined by claim 6 and wherein:
said flexible member engaging said anchor for applying force thereto, and
said flexible member and said anchor being adapted for minimizing friction between said flexible member and said anchor during said flexing.

10. The invention as defined by claim 6, and wherein:
said cross member comprising a grooved edge,
said grooved edge comprising salient edges,
said flexible member engaging said salient edges,
at times when said force received by said flexible member from said tension receiver is small, there being a gap between said flexible member and said groove, said gap being delimited by said salient edges,
there being a predetermined level of said force received by said flexible member from said tension receiver above which seat belt tension measurement is not desired, and
said flexible member and said groove being adapted such that, at levels of said force received by said flexible member from said tension receiver greater than said predetermined level, said flexible member and said groove abut at points between said salient edges.

11. The invention as defined by claim 6 wherein:
said flexible member comprising a base adapted to flex in response to said force received from said tension receiver, and including:
   two arms linked with said base for movement consequent to said flexing, and wherein:
   said two arms having a distance therebetween,
   said distance between said arms being responsive to said force received by said flexible member from said tension receiver, and
   said force sensing means comprising means responsive to said distance between said arms.

12. The invention as defined by claim 11 and including:
a capacitance sensor and two capacitor elements, and wherein:
   there being a first capacitance between one of said two capacitor elements and one of said two arms, said arms being electrically connected,
   there being a second capacitance between the other of said two capacitor elements and the other of said two arms,
   said capacitance sensor being connected to said capacitor elements for sensing the capacitance therebetween,
   said capacitance sensor being adapted for generating a signal responsive to said capacitance between said capacitor elements, and
said signal being said electric signal.

13. The invention as defined by claim 11 wherein:
said base being a low friction bearing operating to bear said tension receiver in its said axial movement.

14. The invention as defined by claim 11 and including:
a permanent magnet for providing a magnetic field between said arms, and
a magnetic field sensor responsive to said magnetic field, and wherein:
   said arms comprise ferromagnetic material,
   said magnetic field sensor being adapted for generating a signal responsive to said magnetic field between said arms, and
   said signal being said electric signal.

15. In an occupant protection system of a vehicle of the type comprising processing means for deploying occupant protection means, a seat belt tension sensor comprising:
   an anchor, said anchor comprising a cross member,
   a flexible member,
   a tension receiver, and
   sensing means for generating an electric signal for transmission to said processing means, and wherein:
   said flexible member being connected with said cross member for applying force thereto,
   said tension receiver being adapted for receiving seat belt tension,
   said tension receiver being connected with said flexible member for applying thereto force derived from said seat belt tension, said flexible member being responsive to said force received from said tension receiver by flexing, and
said electric signal being indicative of said flexing of said flexible member.

16. The invention as defined by claim 15 and including:
a capacitor element, and wherein:
said sensing means for generating an electric signal comprising a capacitance sensing means, and
said capacitance sensing means being responsive to the capacitance between said capacitor element and said flexible member by generating said electric signal.

17. The invention as defined by claim 15 wherein:
said tension receiver being adapted for receiving force from a seat belt, and
said tension receiver being movable with respect to said anchor in the direction of an axis, and including:
means for selecting the axial component of said force from a seat belt received by said tension receiver from other components of said force from a seat belt received by said tension receiver, and wherein:
said force applied to said flexible member by said tension receiver comprising said axial component.

18. The invention as defined by claim 17 and including:
low friction bearing means for bearing said movement of said tension receiver relative to said anchor in the direction of said axis, and wherein:
said means for selecting comprising said bearing means.

19. The invention as defined by claim 18 wherein:
said low friction bearing means comprising a first flexible suspension means engaging both said anchor and said tension receiver.

20. The invention as defined by claim 19 wherein:
said first flexible suspension means being adapted to apply a preload force urging said tension receiver in the direction of said axis.

21. The invention as defined by claim 19 wherein:
said flexible member being a second flexible suspension means engaging both said anchor and said tension receiver for providing a low friction bearing for said tension receiver in its said axial movement.

22. The invention as defined by claim 15 wherein:
said connection between said flexible member and said cross member being adapted for minimizing friction therebetween during said flexing.

23. The invention as defined by claim 15 and including:
an arm, and wherein:
said flexible member being linked with said arm for moving said arm consequent to said flexing.

24. The invention as defined by claim 23 and including:
a capacitor element, and wherein:
said sensing means for generating an electric signal comprising a capacitance sensing means, and
said capacitance sensing means being responsive to the capacitance between said capacitor element and said arm by generating said electric signal.

25. In an occupant protection system of a vehicle of the type comprising processing means for deploying occupant protection means, a seat belt tension sensor comprising:
a tension receiver, and
a moving arm force responder, and wherein:
said moving arm force responder comprising a base adapted to receive force from said tension receiver,
said moving arm force responder also comprising two arms having a distance therebetween, said distance being responsive to said force received from said tension receiver, and including:
means responsive to said distance by generating an electric signal for transmission to said processing means.

26. The invention as defined by claim 25 and including:
a capacitance sensor and two capacitor elements, and wherein:
there being a first capacitance between one of said two capacitor elements and one of said two arms, said arms being electrically connected,
there being a second capacitance between the other of said two capacitor elements and the other of said two arms,
said capacitance sensor being connected to said capacitor elements for sensing the capacitance therebetween,
said capacitance sensor being adapted for generating a signal responsive to said capacitance between said capacitor elements, and
said signal being said electric signal.

27. The invention as defined by claim 25 and including:
an anchor comprising a cross member, and wherein:
said cross member comprising a grooved edge,
said grooved edge comprising salient edges, and
said base engaging said salient edges.

28. The invention as defined by claim 27 wherein:
said base being adapted to flex in response to said force received from said tension receiver, and
said base and said groove being adapted for minimizing friction between said base and said salient edges during said flexing.

29. The invention as defined by claim 27 wherein;
at times when said force received from said tension receiver is small, a gap exists between said base and said groove,
said gap being delimited by said salient edges,
there being a predetermined level of said force received from said tension receiver above which seat belt tension measurement is not desired, and
said base and said groove being adapted such that, at levels of said force received from said tension receiver that are greater than said predetermined level of said force received from said tension receiver, said base and said groove abut at points between said salient edges.

30. The invention as defined by claim 25, and including:
an anchor, and
a first bearing means, and wherein:
said tension receiver being movable in the direction of an axis,
said first bearing means bearing said tension receiver in said movement, and
said first bearing means comprising first flexible suspension means engaging said anchor and said tension receiver.

31. The invention as defined by claim 30 wherein:
said first flexible suspension means being adapted to apply a preload force urging said tension receiver in the direction of said axis.

32. The invention as defined by claim 30, and including:
a second bearing means, and wherein:
said second bearing means bearing said tension receiver in said movement, and
said second bearing means comprising said base of said moving arm force responder engaging both said grooved edge of said anchor and said tension receiver.

* * * * *